(12) United States Patent
Nakagawa (10) Patent No.: US 6,237,058 B1
(45) Date of Patent: May 22, 2001

(54) INTERRUPT LOAD DISTRIBUTION SYSTEM FOR SHARED BUS TYPE MULTIPROCESSOR SYSTEM AND INTERRUPT LOAD DISTRIBUTION METHOD

(75) Inventor: Toshikazu Nakagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/096,608

(22) Filed: Jun. 12, 1998

(30) Foreign Application Priority Data

Jun. 16, 1997 (JP) ............................................ 9-176311

(51) Int. Cl.$^7$ ........................................................ G06F 13/26
(52) U.S. Cl. .......................... 710/260; 710/264; 710/266; 709/102; 709/105
(58) Field of Search ................................. 710/260, 261, 710/264, 266, 268, 123, 124, 48; 709/100, 102, 105

(56) References Cited

U.S. PATENT DOCUMENTS

| | | | |
|---|---|---|---|
| 5,410,710 | * | 4/1995 | Sarangdhar et al. ................. 710/266 |
| 5,495,615 | * | 2/1996 | Nizar et al. ........................... 710/260 |
| 5,555,420 | * | 9/1996 | Sarangdhar et al. ................. 710/266 |
| 5,564,060 | * | 10/1996 | Mahalingaiah et al. ............... 710/51 |
| 5,721,931 | * | 2/1998 | Gephardt et al. ..................... 710/260 |
| 5,790,871 | * | 8/1998 | Qureshi et al. ....................... 710/260 |

FOREIGN PATENT DOCUMENTS

| | | |
|---|---|---|
| 1/283663 | 11/1989 | (JP) . |
| 4-229356 | 8/1992 | (JP) . |
| 4-302353 | 10/1992 | (JP) . |
| 8/329022 | 12/1996 | (JP) . |

* cited by examiner

Primary Examiner—Majid A. Banankhah
(74) Attorney, Agent, or Firm—Foley & Lardner (57) ABSTRACT

An interrupt load distribution system for a shared bus type multiprocessor system includes a processor statistical information table for storing processor statistical information consisting of processor activity ratios under the use by the operating system, processor activity ratios under the use by processes executing under a processor bind, and number of processes requesting a bind from each processor, an interrupt schedule information table for storing interrupt schedule information, an interrupt scheduler for referring to said two tables at fixed time intervals and re-scheduling interrupt load distribution as necessary to achieve appropriate distribution, and an I/O control part for notifying the designated processor of an interrupt request by reflecting a re-schedule created by the interrupt scheduler.

11 Claims, 6 Drawing Sheets

12 PROCESSOR STATISTICAL INFORMATION TABLE

| CPU NO. | CPU ACTIVITY RATIO (System mode) | CPU ACTIVITY RATIO (User mode) | CPU ACTIVITY RATIO UNDER USE OF PROCESS EXECUTING UNDER A PROCESSOR BIND | NUMBER OF PROCESSES REQUESTING A BIND |
|---|---|---|---|---|
| 1 | 0.54 | 0.16 | 0.91 | 3.12 |
| ⋮ | | | | |
| N | 0.36 | 0.24 | 0.31 | 0.75 |

FIG. 3

13 INTERRUPT SCHEDULE INFORMATION TABLE

| INTERRUPT LEVEL | INTERRUPT SOURCE | PRE-DETERMINED CPU NUMBER TO WHICH INTERRUPT IS TO BE NOTIFIED | INTERRUPT PROCESS LOGIC (Function call address) |
|---|---|---|---|
| 3 | DISC DEVICE | 3 | CHANGEABLE TO CPU NO. 2 |
| ... | ... | ... | ... |
| 5 | RESET BUTTON | 1 | STARTS INTERRUPT PROCESS IMMEDIATELY |

FIG. 4

31 INTERRUPT NOTIFICATION DESTINATION INFORMATION TABLE

| INTERRUPT LEVEL | INTERRUPT SOURCE | PRE-DETERMINED CPU NUMBER TO WHICH INTERRUPT IS TO BE NOTIFIED | INTERRUPT PROCESS LOGIC |
|---|---|---|---|
| 3 | DISC DEVICE | 4 | CHANGEABLE TO CPU NO. 3 |
| ... | | | |
| 5 | RESET BUTTON | 1 | STARTS INTERRUPT PROCESS IMMEDIATELY |

INTERRUPT LOAD DISTRIBUTION SYSTEM FOR SHARED BUS TYPE MULTIPROCESSOR SYSTEM AND INTERRUPT LOAD DISTRIBUTION METHOD

BACKGROUNDS OF THE INVENTION

1. Field of the Invention

The present invention relates to an interrupt load distribution for providing optimal distribution of load within a shared bus type multiprocessor system by determining the load status of individual processors and accordingly scheduling interrupt requests generated at I/O, communication or other devices, and an interrupt load distribution method.

2. Description of the Related Art

Basic methods for controlling distribution of load of interrupt processes in a multiprocessor system include a method in which the operating system notifies the hardware of the priorities of processes being executed by individual processors at synchronized points and causes the processor executing the lowest-priority process to carry out an interrupt process, a method in which an interrupt request is issued to all the processors and the processor that has responded to the request the earliest is made to carry out the interrupt process, a method in which the processor that has received an interrupt request notifies the hardware of the next processor to be interrupted according to the round robin or other logic and thus an interrupt process is carried out sequentially, a method in which a processor in an idle state prompts the hardware to allocate an interrupt request to itself, and a method that combines these methods as necessary.

One prior art for choosing the most appropriate among multiple processors in ensuring optimal load balance within the entire system and making the processor to carry out an interrupt process is disclosed in Japanese Patent Laying-Open (Kokai) No. Heisei 8-329022, entitled "System for Controlling Distribution of I/O Process Load in Multiprocessor System." The art recited in this literature consists of I/O processing processes for performing various I/O processes by being scheduled by a scheduler individually to different operation processors, a request ticket table for designating an I/O processing process to perform a requested I/O process, a return ticket table which is provided for each I/O processing process for registering an I/O action to be processed by that I/O processing process, and an I/O process load distributing part for referring to the request ticket table when an I/O process is requested and registering such I/O process into the return ticket table specified in the request ticket table, thereby achieving well-balanced control of load distribution.

As stated above, in conventional shared bus type multiprocessor systems, greater weight is given to distributing interrupt processes depending on such information as the number of interrupt processes or according to the round robin scheduling or otherwise to distributing interrupt processes among idle-state processors detected, rather than to responding to the running status of applications or the state of the operating system that changes from one moment to the next. These methods have not necessarily been effective in distributing interrupt load since they may fail to achieve good balance between processor load caused by processor binds executed by applications and interrupt load, resulting in a possible decrease in the execution speed of applications.

Also, a scheduling policy for distributing interrupt load that is incorporated in an operating system is fixed, which makes it difficult to change the scheduling policy flexibly and easily according to the running status of applications or the state of the operating system on respective user systems.

Furthermore, the system for controlling distribution of I/O process load disclosed in Japanese Patent Laying-Open (Kokai) No. Heisei 8-329022 uses response times for I/O processes as a basis of considering load balance, leaving the running status of applications or the state of the operating system unconsidered, and therefore an improvement in application throughput or system performance cannot necessarily be expected.

SUMMARY OF THE INVENTION

An object of the present invention is to provide an interrupt load distribution system for a shared bus type multiprocessor system, which can minimize a decrease in applications' execution speed and achieve an improved system throughput by performing re-scheduling according to the running status of applications and the state of the operating system that changes from one moment to another to ensure optimum distribution of interrupt load and thereby to achieve good balance between processor load and interrupt load, and an interrupt load distribution method for this system.

Another object of the present invention is to provide an interrupt load distribution system for a shared bus type multiprocessor system, which can improve system performance by customizing an interrupt schedule according to the running status of applications and the state of the operating system on respective user systems and optimizing the distribution of interrupt load.

According to the first aspect of the invention, an interrupt load distribution system for determining the status of load for each processor in a shared bus type multiprocessor system, scheduling interrupt requests that are generated, and distributing load within the system, comprises processor statistical information table for storing processor statistical information, consisting of processor activity ratios under the use by the operating system, processor activity ratios under the use by processes executing under a processor bind, and number of processes requesting a bind from each processor, interrupt schedule information table for storing interrupt schedule information which represents a basic rule for distributing interrupt load within an appropriate range, interrupt scheduling means for referring to information in the processor statistical information table and the schedule information table at fixed time intervals and re-scheduling interrupt load distribution as necessary to achieve appropriate distribution, and notifying means incorporating an interrupt notification destination information table that stores information concerning the destination to which an interrupt is to be notified, which is updated during re-scheduling by the interrupt scheduling means, for notifying the designated processor of an interrupt request based on information in the interrupt notification destination information table.

In the preferred construction, the interrupt scheduling means may comprise resident-type system processes that are not affected by the status of system load.

In the preferred construction, the interrupt schedule means determines whether re-scheduling of interrupt load distribution is required or not by comparing processor statistics information in the processor statistical information table with pre-determined criterion values, when it determines that re-scheduling is required, determines a schedule within an appropriate range based on schedule information in the interrupt schedule information table, and notifies interrupt notification information to the interrupt notifying means in accordance with the schedule thus determined, and the interrupt notifying means registers the interrupt notification information in the interrupt notification destination information table in response to notification from the interrupt scheduling means, and notifies the designated processor of an interrupt based on the information concerning destination of interrupt notification.

In the preferred construction, the processor statistical information table is updated on condition that an clock interrupt of the operating system or one or more point in the code of the operating system has been executed, and the processor statistical information table and the interrupt schedule information table allow a supervisor, a privileged user, to refer to and modify processor statistical information and interrupt schedule information by issuing a supervisor call.

In another preferred construction, the interrupt schedule information table has entries corresponding to different interrupt levels, and stores, as the interrupt schedule information, at least interrupt resource, pre-determined processor number to which interrupt is to be notified, and process logic for specifying a basic rule to be observed when an interrupt has been received, and the interrupt notification destination information table stores, as information concerning the interrupt notification destination, interrupt resource, processor number to which interrupt is to be notified, and interrupt notification information notified from the interrupt scheduling means.

In another preferred construction, the interrupt scheduling means refers to processor statistical information in the processor statistical information table and determines whether values of processor activity ratios for respective processors, processor activity ratios under the use by processes executing under a processor bind, and number of processes requesting a bind from each processor exceed pre-determined criterion values for showing whether interrupt load distribution is appropriate or not, and when the determination reveals that all the criterion values are exceeded, selects the processor that shows the least excess amount over the criterion value, and re-schedules so that an interrupt request will be issued to such processor.

In another preferred construction, the interrupt notifying means is an I/O control means that has an interrupt notification destination information table for storing information concerning I/O interrupt notification destinations and that notifies the designated processor of an interrupt based on information in the interrupt notification destination information table.

According to the second aspect of the invention, an interrupt load distribution method for determining the status of load for each processor in a shared bus type multiprocessor system, scheduling interrupt requests that are generated, and distributing load within the system, comprising the steps of referring at fixed time intervals to processor statistical information, including processor activity ratios under the use by the operating system, processor activity ratios under the use by processes executing under a processor bind, and number of processes currently requesting a bind from each processor, and interrupt schedule information which represents a basic rule for distributing interrupt load within an appropriate range, determining whether re-scheduling of interrupt load distribution is required or not by comparing processor statistics information in the processor statistical information table with pre-determined criterion values, when it is determined that re-scheduling is required, determining a schedule within an appropriate range based on schedule information in the interrupt schedule information table, when the re-scheduling is not to be performed, notifying the designated processor of an interrupt request based on information concerning the existing interrupt notification destination, and when the re-scheduling has been performed, updating information concerning the interrupt notification destination based on a newly determined schedule and notifying the designated processor of an interrupt based on information concerning the the updated interrupt notification destination.

In the preferred construction, the re-scheduling step further comprising steps of referring to the processor statistical information to determine whether or not values of processor activity ratios for respective processors, processor activity ratios under the use by processes executing under a processor bind, and number of processes currently requesting a bind from each processor exceed pre-determined criterion values for showing whether interrupt load distribution is appropriate or not, and when the determination reveals that all the criterion values are exceeded, selecting the processor that shows the least excess amount over the criterion value, and re-scheduling so that an interrupt request will be issued to such processor.

According to another aspect of the invention, a computer readable memory storing a control program for controlling the interrupt load distribution system which determines load status for each processor in a shared bus type multiprocessor system, schedules interrupt requests that are generated, and distributes load within the system, wherein the control program comprising steps of referring at fixed time intervals to processor statistical information, including processor activity ratios under the use by the operating system, processor activity ratios under the use by processes executing under a processor bind, and number of processes currently requesting a bind from each processor, and interrupt schedule information which represents a basic rule for distributing interrupt load within an appropriate range, determining whether re-scheduling of interrupt load distribution is required or not by comparing processor statistics information in the processor statistical information table with pre-determined criterion values, when it is determined that re-scheduling is required, determining a schedule within an appropriate range based on schedule information in the interrupt schedule information table, when the re-scheduling is not to be performed, notifying the designated processor of an interrupt request based on information concerning the existing interrupt notification destination, and when the re-scheduling has been performed, updating information concerning the interrupt notification destination based on a newly determined schedule and notifying the designated processor of an interrupt based on information concerning the the updated interrupt notification destination.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
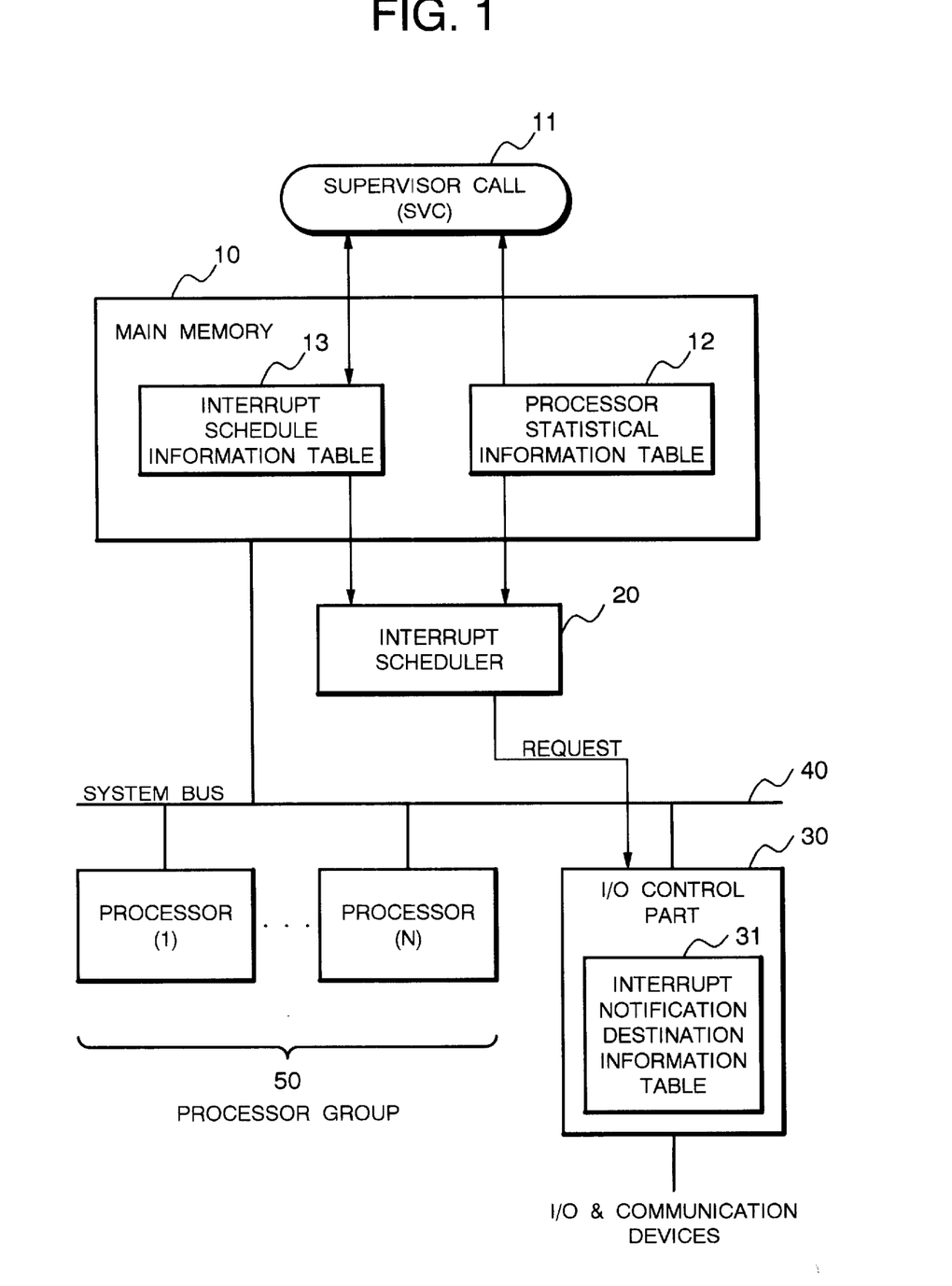
FIG. 1 is a block diagram showing the constitution of an interrupt load distribution system for a shared bus type multiprocessor system according to one embodiment of the present invention.

FIG. 1 is a block diagram showing the constitution of an interrupt load distribution system for a shared bus type multiprocessor system according to one embodiment of the present invention.

With reference to FIG. 1, a shared bus type multiprocessor system of the present embodiment includes a main memory 10 provided with two types of information tables, an interrupt scheduler 20 for scheduling interrupt processes, I/O control part 30, system bus 40, and a processor group 50 consisting of multiple processors (1)–(N). In FIG. 1, illustration is made only of a characteristic part of the constitution of the present embodiment but not of the remaining common part.

In the main memory 10, a processor statistical information table 12 and an interrupt schedule information table 13 reside in such a manner that they will not be affected by the load status of the system. Statistical information of the processor statistical information table 12 is updated on condition that the clock of the operating system has been interrupted or that one or more points embedded in the codes of the operating system has been executed. Information stored in the processor statistical information table 12 and the interrupt schedule information table 13 can be accessed for reference or updating at any time using a supervisor call (SVC) 11, which is issued by a supervisor, a privileged user authorized to operate system data.

The interrupt scheduler 20 is activated at fixed time intervals in response to notification issued by a clock interrupt or an alarm timer, and refer to the statistical information in the processor statistical information table 12. Then it determines whether re-scheduling for distributing interrupt load is required or not by comparing the statistical information to pre-established criterion values. The interrupt scheduler 20 comprises a resident-type system process which is implemented using, for example, a program-controlled CPU and an RAM or other internal memory configured so as to prevent influence by the load status of the system. A control program for controlling the CPU is supplied in a electromagnetic or optical disc, a semi-conductor memory or other common storage medium, and after being loaded in the internal memory, the program executes the functions of the interrupt scheduler 20 by controlling the CPU.

In the I/O control part 30, an interrupt notification destination information table 31 is resident for indicating the destination of an interrupt request issued from I/O processes, including both I/O and communication ones. The table information in the interrupt notification destination request 31 is added or modified according to a request issued from the interrupt scheduler 20.

Figure 2:
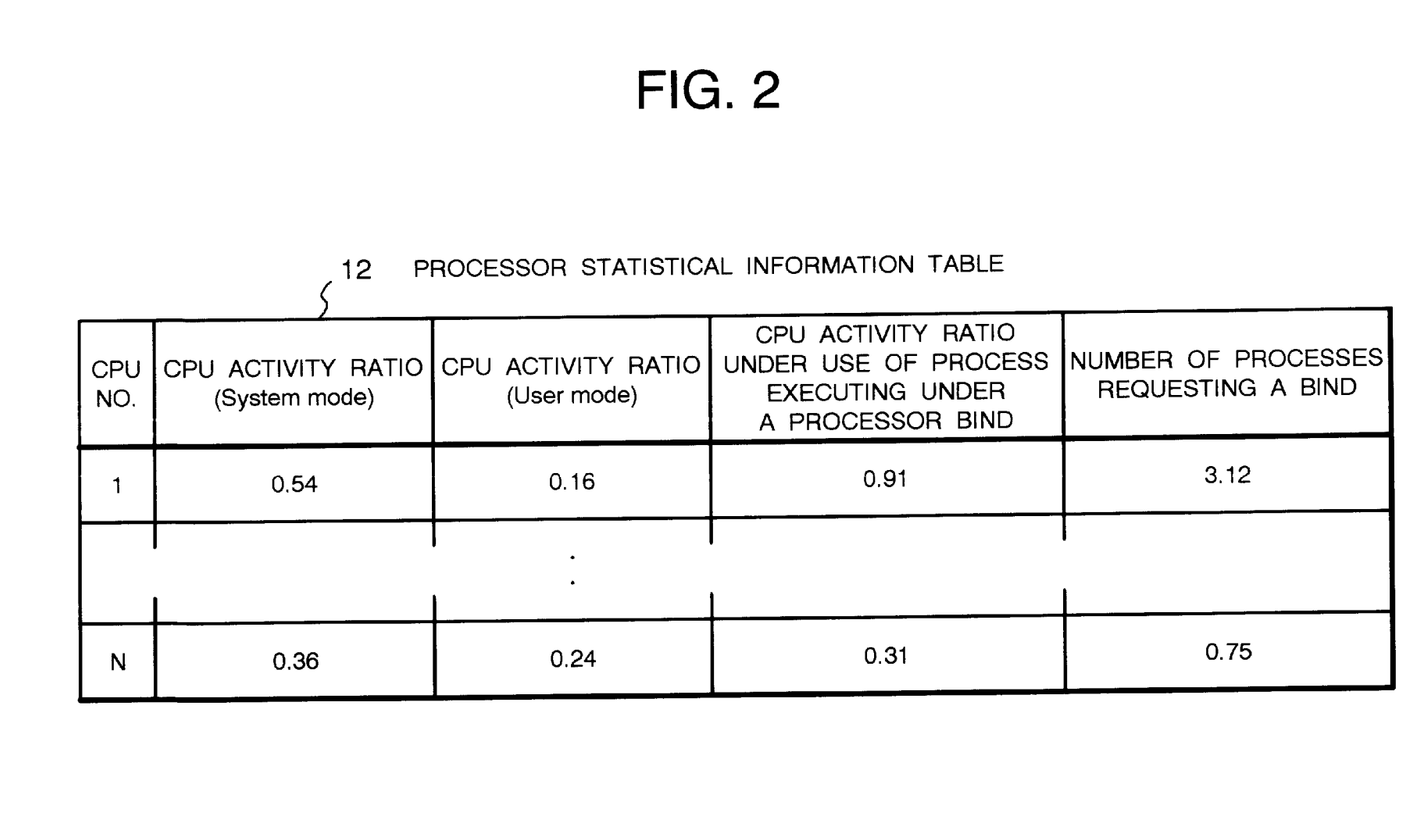
FIG. 2 is a diagram showing an example of configuration for a processor statistical information table according to the present embodiment.

Next, each of the information tables will be detailed. As shown in FIG. 2, the processor statistical information table 12 has several entries for different processor numbers (1–N in the diagram), and stores, as information pertaining to the processors (1)–(N) over a given time period for reference by the interrupt scheduler 20, the processor activity ratios under the use by the operating system in System mode and in User mode, the processor activity ratio under the use by a process executing under a processor bind, and the number of processes currently requesting a processor bind.

Figure 3:
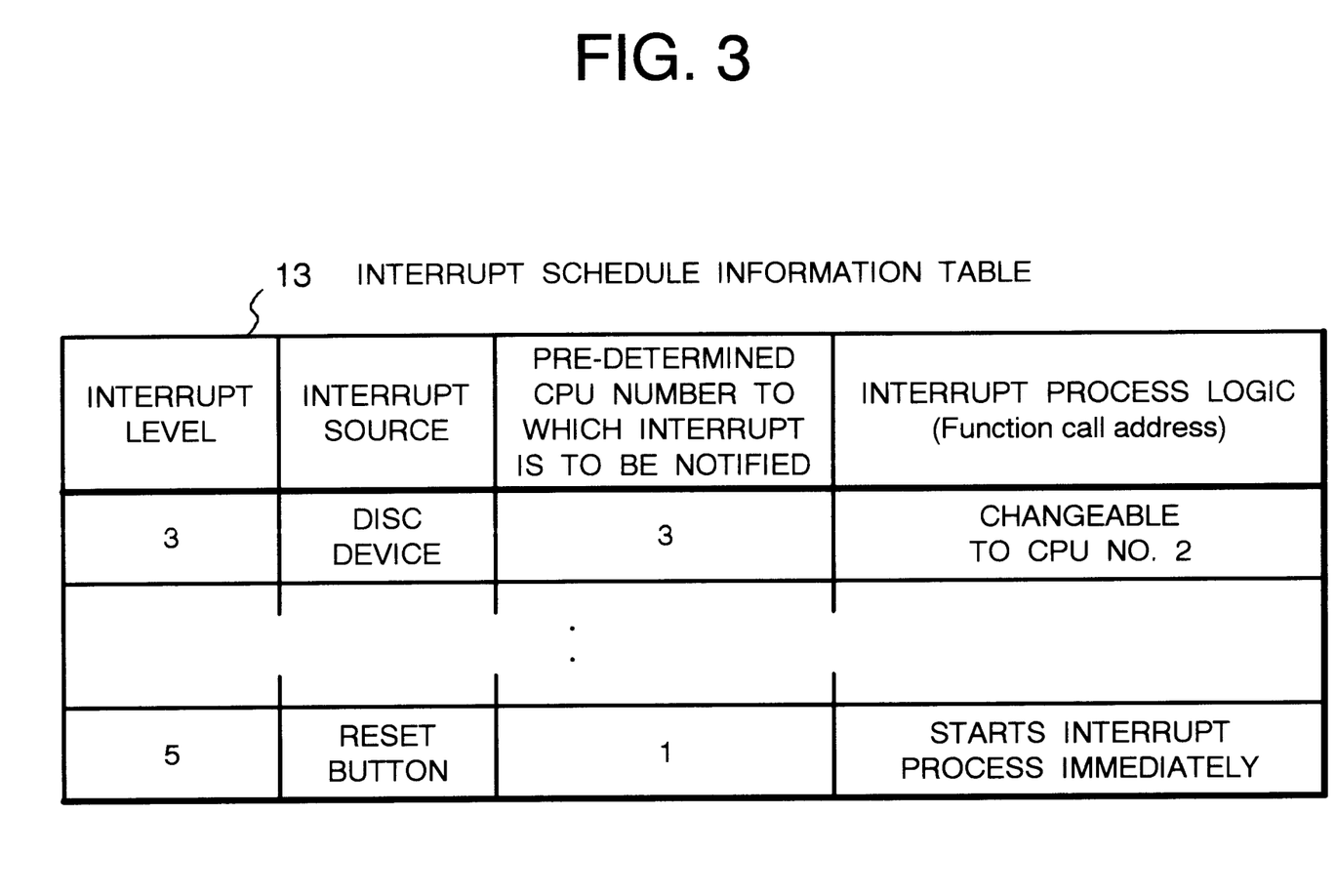
FIG. 3 is a diagram showing an example of configuration for an interrupt schedule information table according to the present embodiment.

As shown in FIG. 3, the interrupt schedule information table 13 has several entries for different interrupt levels, and stores, as information, interrupt resources, predefined processor numbers to which interrupt notification is to be sent, and process logic (function call address) for specifying basic rules to be observed when an interrupt request has been accepted.

Figure 4:
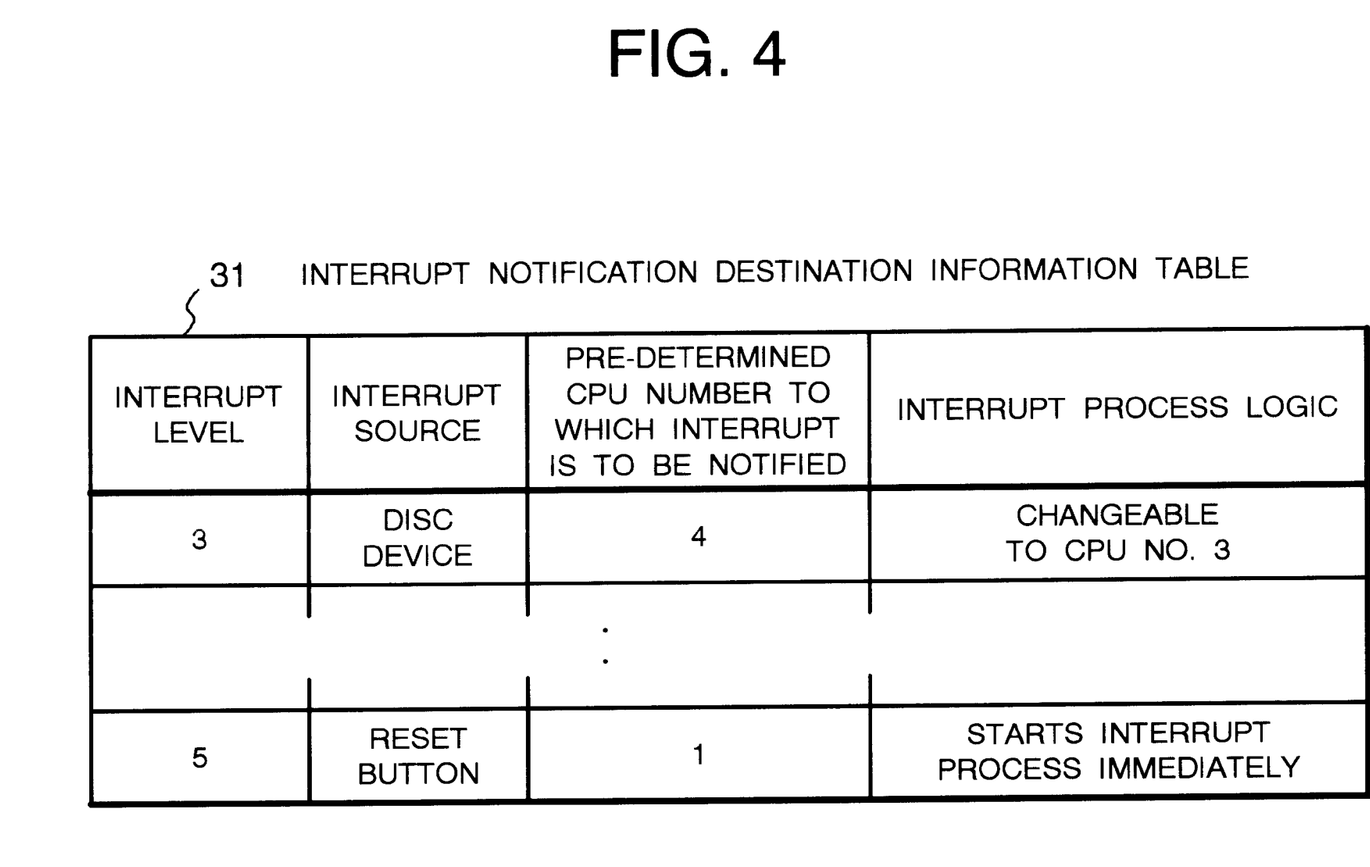
FIG. 4 is a diagram showing an example of configuration for an interrupt notification destination information table according to the present embodiment.

As shown in FIG. 4, the interrupt notification destination information table 31 has several entries for different interrupt levels, and stores, as information, interrupt resources, processor numbers to which interrupt notification is to be sent, and interrupt notification processes attached to requests sent from the interrupt scheduler 20. Interrupt notification processes attached to requests sent from the interrupt scheduler 20 are those processes that are pre-determined in the hardware specifications. The information of such interrupt notification processes are passed to the I/O control part 30, which recognizes which process is necessary based on such information and executes such process.

Next, the contents of the processes performed by the interrupt scheduler 20 will be detailed with reference to the flow chart of FIG. 5.

Figure 5:
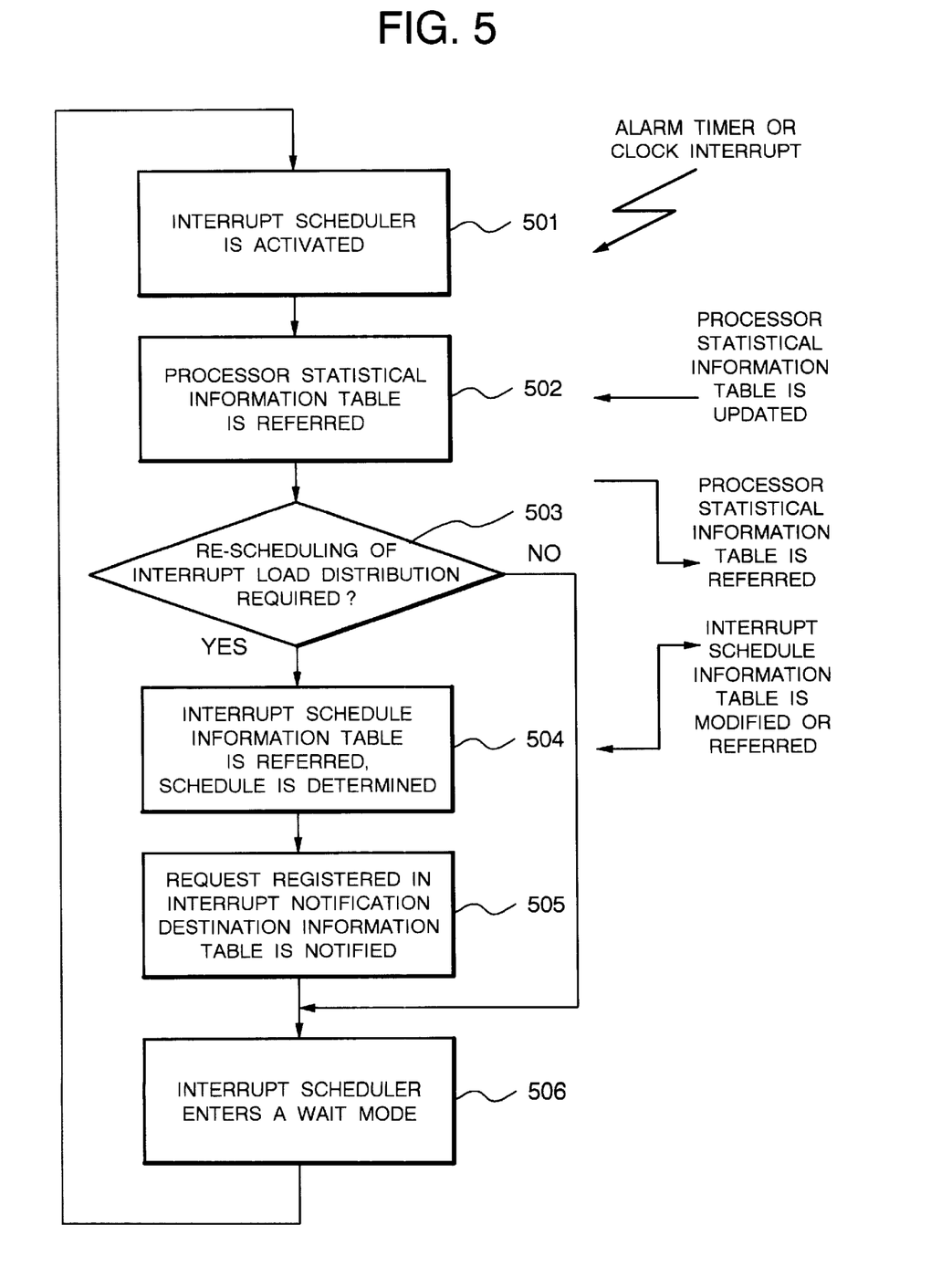
FIG. 5 is a flow chart showing the operation of an interrupt scheduler according to the present embodiment.

With reference to the flow chart of FIG. 5, the interrupt scheduler 20 is activated at fixed time intervals in response to notification issued by a clock interrupt or an alarm timer (Step 501), and it first refers to the processor statistical information table 12 to evaluate the interrupt load distribution schedule that has been employed (Step 502). An interrupt load distribution schedule is initially determined based on the information in the interrupt schedule information table 13.

The interrupt scheduler 20 then determines whether re-scheduling for distributing interrupt load is required or not based on the statistical information on all the processors, which it has acquired by referring to the processor statistical information table 12 (Step 503). The contents of the process in Step 503 to determine whether re-scheduling for distributing interrupt load is required or not will be detailed with reference to the flowchart of FIG. 6.

Figure 6:
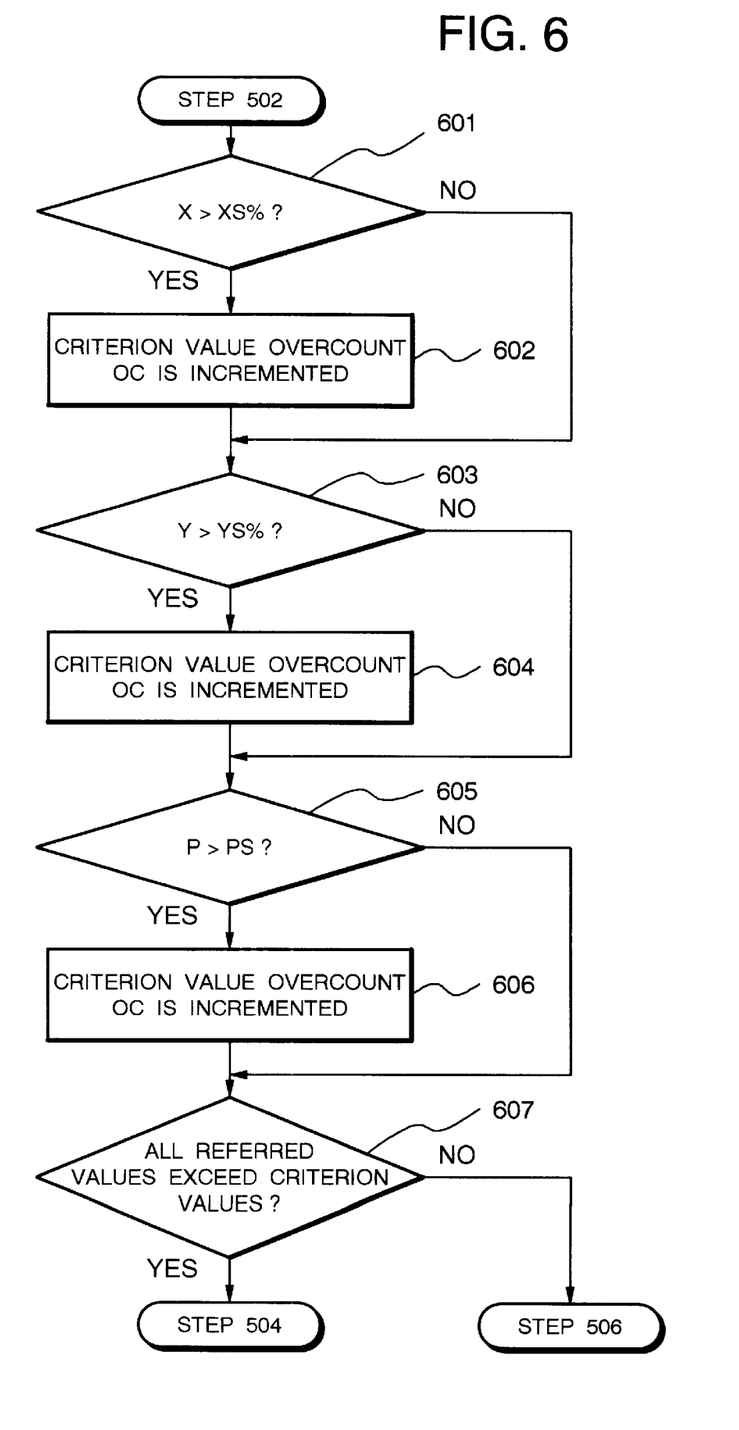
FIG. 6 is a flow chart showing the contents of the action to determine whether re-scheduling is required or not, which is one of the actions of an interrupt scheduler according to the present embodiment.

With reference to FIG. 6, the interrupt scheduler 20 compares the information that it has acquired by referring to the processor statistical information table 12, including total X (%) of processor activity ratios for each processor under the use by the operating system in System mode and in User mode, processor activity ratio Y (%) under the use by a process executing under a processor bind, and number of processes P currently requesting a processor bind, with pre-determined criterion values (XS %, YS %, PS) on a processor-to-processor basis (Steps 602, 604, and 606).

First, the total X of the processor activity ratios in System mode and in User mode is compared with the criterion value XS (Step 601); if the total X of the processor activity ratios exceeds the criterion value XS, an overcount OC is incremented (Step 602).

Next, the processor activity ratio Y under the use by a process executing under a processor bind is compared with the criterion value YS (Step 603); if the processor activity ratio Y exceeds the criterion value YS, the overcount OC is incremented (Step 604).

Next, the number of processes P currently requesting a processor bind is compared with the criterion value PS (Step 605); if the number of processes P currently requesting a processor bind exceeds the criterion value PS, the overcount OC is incremented (Step 606).

Finally, based on the value recorded on the overcount OC, it is determined wither all the values acquired by referring to the processor statistical information table 12 exceed all the criterion values (Step 607) or not. If one or more of the results from Steps 601, 603, and 605 is equal to or below the criterion values, then it means the current distribution of interrupt load is appropriate and that re-scheduling is not required. The interrupt scheduler 20 enters a wait state and remains so until the clock interrupt or the alarm timer issues notification (Step 506).

The processes in Steps 601 to 608 above are repeated for all the processors. The comparison processes in Steps 601, 603, and 605 do not necessarily have to be performed in the order shown in FIG. 6. As far as the three parameters are all compared, these comparisons may be in any order or may be performed concurrently.

If the determination process in Step 607 reveals that all the values acquired by referring to the processor statistical information table 12 exceed all the criterion values (Step 607), then it means that the distribution of interrupt load that has been employed for the processes up to then is inappropriate and that re-scheduling is required. The interrupt scheduler 20 refers to the interrupt schedule information table 13, and performs re-scheduling (Step 504). In this scheduling, the processor that shows the least excess amount over the criterion value, that is, the least overcount value OC, is selected, and it is so scheduled that an interrupt request will be issued to such processor.

Furthermore, using this new schedule, the processor number to be designated as the destination of notification is compared with the information in the interrupt schedule information table 13, i.e., interrupt level, interrupt resource, and the processor number pre-determined as the destination of notification. If the two processor numbers are not identical, the process logic (function call address) for specifying basic rules to be observed when an interrupt request has been accepted is performed to ensure that scheduling will be made within an appropriate range by such means as sending notification to the inappropriate processor or making compensation so as to prevent an excessive bias from occurring in interrupt notifications to be made based on the schedule. Thus, a schedule will be determined based on the information in the interrupt schedule information table 13, which is to be the basic rule thereafter.

If the two processor numbers are identical, the processor designated by such new schedule as the destination of notification is selected and an interrupt request is notified to that processor. In accordance with the schedule determined in Step 504, the interrupt scheduler 20 sends the I/O control part 30 a request containing the information on interrupt level, interrupt resource, processor number to which an interrupt is to be notified, and request number (Step 505).

The I/O control part 30 receiving the request from the interrupt scheduler 20 adds each item of the information to the interrupt notification destination information table 31 as new entries. Otherwise, if the interrupt notification destination information table 31 already has any entry coinciding with the interrupt level, interrupt resource, or processor number to which an interrupt is to be notified, then the information in the request is modified, using the information in the existing entry. At this time, the I/O control part 30 recognizes which interrupt notification process is to be performed in accordance with the request, and registers it in the appropriate field in the interrupt notification destination information table 31. Then, based on the information registered in the interrupt notification destination information table 31, the I/O control part 30 distributes interrupt load by notifying the processor designated in the interrupt request.

For reset/dump interrupts, software interrupts and other interrupts that do not go through the I/O control part 30, the interrupt control means of the operating system refers to the interrupt notification destination information table 31, and, based on the information thus obtained, notifies the designated processor of an interrupt process.

As described in the foregoing, in an interrupt load distribution system of the present invention, an interrupt scheduler determines whether re-scheduling of interrupt load distribution is required or not by comparing processor statistical information, consisting of total of the processor activity ratios under the use by the operating system, processor activity ratios under the use by processes executing under a processor bind, and number of processes currently requesting a bind from each processor, with pre-determined criterion values at fixed time intervals, and if it determines that re-scheduling is required, it further determines a schedule within an appropriate range based on schedule information in an interrupt schedule information table. Thus, by notifying an interrupt request to a pre-determined processor in accordance with a new schedule thus determined, it is possible to re-schedule interrupt load distribution to an appropriate one in close correspondence to the running status of applications or the state of the operating system that changes from one moment to another. This leads to good balance between processor load and interrupt load, which provides an effect that a decrease in the execution speeds of applications can be minimized and an improved system throughput can be expected.

Another effect is that, by allowing a supervisor, a privileged user, to refer to and modify processor statistical information and interrupt schedule information while taking into account the running status of applications and the state of the operating system on each user system, a scheduling policy for distributing interrupt load can be modified flexibly and easily and an improved system performance can be achieved by customizing.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An interrupt load distribution system for determining the status of load for each processor in a shared bus type multiprocessor system, scheduling interrupt requests that are generated, and distributing load within the system, comprising:

processor statistical information table for storing processor statistical information, consisting of processor activity ratios under the use by the operating system, processor activity ratios under the use by processes executing under a processor bind, and number of processes requesting a bind from each processor;

interrupt schedule information table for storing interrupt schedule information which represents a basic rule for distributing interrupt load within an appropriate range;

interrupt scheduling means for referring to information in said processor statistical information table and said schedule information table at fixed time intervals and re-scheduling interrupt load distribution as necessary to achieve appropriate distribution; and notifying means incorporating an interrupt notification destination information table that stores information concerning the destination to which an interrupt is to be notified, which is updated during re-scheduling by said interrupt scheduling means, for notifying the designated processor of an interrupt request based on information in said interrupt notification destination information table.

2. The interrupt load distribution system as set forth in claim 1, wherein said interrupt scheduling means comprising resident-type system processes that are not affected by the status of system load.

3. The interrupt load distribution system as set forth in claim 1, wherein said interrupt schedule means determines whether re-scheduling of interrupt load distribution is required or not by comparing processor statistics information in said processor statistical information table with pre-determined criterion values, when it determines that re-scheduling is required, determines a schedule within an appropriate range based on schedule information in said interrupt schedule information table, and notifies interrupt notification information to said interrupt notifying means in accordance with the schedule thus determined, and said interrupt notifying means registers said interrupt notification information in said interrupt notification destination information table in response to notification from said interrupt scheduling means, and notifies the designated processor of an interrupt based on said information concerning destination of interrupt notification.

4. The interrupt load distribution system as set forth in claim 1, wherein said processor statistical information table is updated on condition that an clock interrupt of the operating system or one or more point in the code of the operating system has been executed, and said processor statistical information table and said interrupt schedule information table allow a supervisor, a privileged user, to refer to and modify processor statistical information and interrupt schedule information by issuing a supervisor call.

5. The interrupt load distribution system as set forth in claim 1, wherein said interrupt schedule information table has entries corresponding to different interrupt levels, and stores, as said interrupt schedule information, at least interrupt resource, pre-determined processor number to which interrupt is to be notified, and process logic for specifying a basic rule to be observed when an interrupt has been received, and said interrupt notification destination information table stores, as information concerning said interrupt notification destination, interrupt resource, processor number to which interrupt is to be notified, and interrupt notification information notified from said interrupt scheduling means.

6. The interrupt load distribution system as set forth in claim 1, wherein said interrupt scheduling means refers to processor statistical information in said processor statistical information table and determines whether values of processor activity ratios for respective processors, processor activity ratios under the use by processes executing under a processor bind, and number of processes requesting a bind from each processor exceed pre-determined criterion values for showing whether interrupt load distribution is appropriate or not, and when said determination reveals that all the criterion values are exceeded, selects the processor that shows the least excess amount over the criterion value, and re-schedules so that an interrupt request will be issued to such processor.

7. The interrupt load distribution system as set forth in claim 1, wherein said interrupt notifying means is an I/O control means that has an interrupt notification destination information table for storing information concerning I/O interrupt notification destinations and that notifies the designated processor of an interrupt based on information in said interrupt notification destination information table.

8. An interrupt load distribution method for determining the status of load for each processor in a shared bus type multiprocessor system, scheduling interrupt requests that are generated, and distributing load within the system, comprising the steps of:

referring at fixed time intervals to processor statistical information, including processor activity ratios under the use by the operating system, processor activity ratios under the use by processes executing under a processor bind, and number of processes currently requesting a bind from each processor, and interrupt schedule information which represents a basic rule for distributing interrupt load within an appropriate range;

determining whether re-scheduling of interrupt load distribution is required or not by comparing processor statistics information in said processor statistical information table with pre-determined criterion values;

when it is determined that re-scheduling is required, determining a schedule within an appropriate range based on schedule information in said interrupt schedule information table;

when said re-scheduling is not to be performed, notifying the designated processor of an interrupt request based on information concerning the existing interrupt notification destination; and when said re-scheduling has been performed, updating information concerning the interrupt notification destination based on a newly determined schedule and notifying the designated processor of an interrupt based on information concerning the said updated interrupt notification destination.

9. An interrupt load distribution method as set forth in claim 8, wherein said re-scheduling step further comprising steps of:

referring to said processor statistical information to determine whether or not values of processor activity ratios for respective processors, processor activity ratios under the use by processes executing under a processor bind, and number of processes currently requesting a bind from each processor exceed pre-determined criterion values for showing whether interrupt load distribution is appropriate or not, and when said determination reveals that all the criterion values are exceeded, selecting the processor that shows the least excess amount over the criterion value, and re-scheduling so that an interrupt request will be issued to such processor.

10. A computer readable memory storing a control program for controlling the interrupt load distribution system which determines load status for each processor in a shared bus type multiprocessor system, schedules interrupt requests that are generated, and distributes load within the system, wherein said control program comprising steps of:

referring at fixed time intervals to processor statistical information, including processor activity ratios under the use by the operating system, processor activity ratios under the use by processes executing under a processor bind, and number of processes currently requesting a bind from each processor, and interrupt schedule information which represents a basic rule for distributing interrupt load within an appropriate range;

determining whether re-scheduling of interrupt load distribution is required or not by comparing processor statistics information in said processor statistical information table with pre-determined criterion values;

when it is determined that re-scheduling is required, determining a schedule within an appropriate range based on schedule information in said interrupt schedule information table;

when said re-scheduling is not to be performed, notifying the designated processor of an interrupt request based on information concerning the existing interrupt notification destination; and when said re-scheduling has been performed, updating information concerning the interrupt notification destination based on a newly determined schedule and notifying the designated processor of an interrupt based on information concerning the said updated interrupt notification destination.

11. The computer readable memory as set forth in claim 10, wherein said re-scheduling step of said control program further comprising steps of, referring to said processor statistical information to determine whether or not values of processor activity ratios for respective processors, processor activity ratios under the use by processes executing under a processor bind, and number of processes currently requesting a bind from each processor exceed pre-determined criterion values for showing whether interrupt load distribution is appropriate or not, and when said determination reveals that all the criterion values are exceeded, selecting the processor that shows the least excess amount over the criterion value, and re-scheduling so that an interrupt request will be issued to such processor.

* * * * *